July 7, 1970 F. U. BACCI 3,519,846
FREQUENCY-DOUBLER CIRCUIT
Filed Aug. 10, 1967
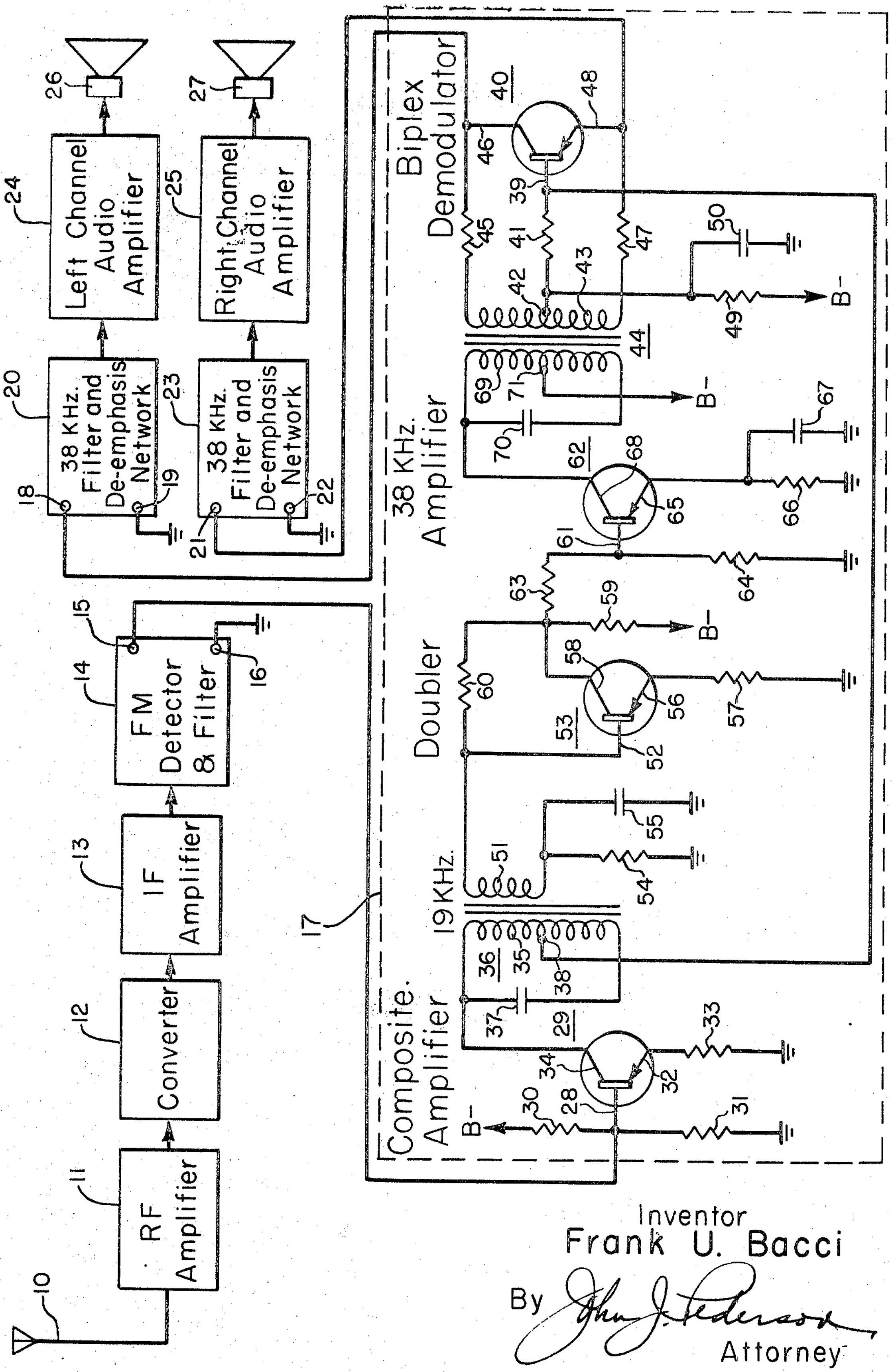
Inventor
Frank U. Bacci
By John J. Pederson
Attorney

United States Patent Office 3,519,846
Patented July 7, 1970

3,519,846
FREQUENCY-DOUBLER CIRCUIT
Frank U. Bacci, Berwyn, Ill., assignor to Zenith Radio Corporation, Chicago, Ill., a corporation of Delaware
Filed Aug. 10, 1967, Ser. No. 659,662
Int. Cl. H02m 5/30
U.S. Cl. 307—225 1 Claim

ABSTRACT OF THE DISCLOSURE

A frequency-doubler circuit for use in the demodulation channel of a wave-signal receiver adapted to receive suppressed-carrier transmissions. The inverted-phase output signal from an amplifier device conditioned to operate only on alternate half-cycles of an applied pilot-carrier signal is combined with at least an in-phase portion of that pilot-carrier signal to generate a continuous-wave double-frequency demodulation signal, which is utilized by a conventional phase demodulator to demodulate the suppressed-carrier signal. Since the circuit does not require inductors, it is ideally suited for economical manufacture in integrated circuit form. A single embodiment in the form of a receiver adapted to receive standard United States stereophonic FM transmissions is shown.

SPECIFICATION

Background of the invention

The present invention relates in general to wave-signal receivers for utilizing a suppressed-carrier amplitude-modulated signal, and more specifically, to an improved frequency-doubler circuit for use therein.

Although receivers of the type described have a wide range of applications, they are specially suited for producing separated audio signals from a received frequency-modulated stereophonic broadcast transmission and, consequently, the invention will be described in that environment. Stereophonic program transmissions, as defined by the specifications of the Federal Communications Commission, comprise a primary carrier which is frequency-modulated in accordance with a complex or composite modulating function having as one component the sum of two audio signals and, as another, a subcarrier which has been suppressed-carrier amplitude-modulated by the difference of the same two audio signals. The two audio signals, which correspond to the left and right channels of the stereophonic program, are derived in a stereophonic receiver by first demodulating the transmitted carrier in a frequency-modulation detector and then operating on the two components of the resulting composite signal to develop the two audio signals separated from each other. A preferred circuit for obtaining the two audio signals from the detected composite signal is described and claimed in United States Letters Pat. No. 3,151,217 to Flemina Dias, assigned to the present assignee.

In order to detect the suppressed AM subcarrier component, which conveys the difference of the two audio components of the stereo program, it is necessary to apply to the subcarrier amplitude-modulation detector a continuous-wave demodulation signal corresponding in phase to the missing carrier. To facilitate generating this signal, a phase-synchronized pilot-carrier is frequency-modulated on the primary carrier. Since for reasons of circuit economy and to obtain maximum utilization of existing FM channels the pilot-carrier is transmitted at 19 kHz., a subharmonic of one-half the fundamental frequency of the suppressed 38 kHz. subcarrier, it has become standard practice to incorporate a frequency-doubler stage in stereophonic wave receivers to generate the necessary 38 kHz. demodulation signal.

One prior art doubler stage employed a pair of diodes connected back-to-back across a balanced center-tapped interstage coupling transformer into which was fed the 19 kHz. pilot-carrier. The diodes, being rendered conductive in alternation by the applied 19 kHz. pilot-signal, produced a 38 kHz. carrier component across a common load impedance which was subsequently amplified and applied to the subcarrier amplitude-modulation detector. Such a circuit, although providing generally adequate performance, is not well suited for integrated circuit manufacture because of the balanced interstage transformer, which would be intolerably bulky and expensive in an integrated circuit environment. For this reason, a demand has arisen for an inductorless frequency-doubler circuit which will lend itself to low cost mass-production techniques in future integrated circuit stereophonic wave receiver designs.

Summary of the invention

Accordingly, it is a general object of the invention to provide a new and improved frequency-doubler circuit for use in a suppressed-carrier wave receiver.

It is a more specific object of the invention to provide a frequency-doubler circuit ideally suited for economical manufacture in integrated circuit form.

The invention is directed to a frequency-doubler for use in a wave-signal receiver adapted to receive a composite signal of the type having a suppressed-carrier subcarrier signal component and a pilot-carrier signal component of one-half the frequency of the subcarrier component. The invention comprises a conditionally operable amplifier device having an input terminal and an output terminal. Means coupled to the input terminal are provided for applying the pilot-carrier signal component to the amplifier device and an output load impedance is coupled to the output terminal of the amplifier device. Means are provided for conditioning the amplifier device to be operative only during alternate half-cycles of the applied pilot-carrier signal to generate in the load impedance a signal corresponding to alternate half-cycles of the pilot-carrier. Finally, means coupled to the output load impedance apply thereto at least a predetermined portion of the pilot-carrier signal, causing the signal so applied to combine with the signal from the amplifier device to create in the load impedance a signal of twice the frequency of the pilot-carrier.

Brief description of the drawings

The foregoing and other objects of the invention which are believed to be novel are set forth with particularity in the appended claims. The organization and manner of operation of the invention, together with further objects and advantages thereof, may best be understood by reference to the following description taken in conjunction with the accompanying drawing, in which the single figure is a schematic representation, partially in block form, of a stereophonic radio receiver embodying the present invention.

Description of the preferred embodiment

With the exception of certain detailed circuitry in the stereo demodulation channel, the illustrated receiver is essentially conventional in design and therefore only a brief description of its structure and operation need be given here. A received signal is intercepted by an antenna 10 and coupled in a conventional manner to a radio frequency (RF) amplifier 11, which may contain one or more frequency-selective stages. The output of RF amplifier 11 is applied to a converter 12, wherein it is translated to an intermediate-frequency for subsequent amplification by IF amplifier 13, which may comprise a plurality of individual tuned amplifier and limiting circuits. The IF output signal from IF amplifier 13 is applied to an FM detector and filter 14, wherein the received carrier transmission is demodulated to obtain a composite modulation signal at detector output terminals 15 and 16.

The composite signal from FM detector 14 consists of three components; an audio frequency component representing the sum $(L+R)$ of the left and right audio signals which comprise the stereophonic program, a 38 kHz. suppressed-carrier subcarrier component representing the difference $(L-R)$ of the same two audio signals, and a 19 kHz. pilot-carrier component. In the present embodiment these components are coupled from detector 14 to a demodulator channel, identified by dashed outline 17 in the drawing, wherein appropriate demodulating and matrixing circuitry derive the left and right channel audio program signals from the composite signal.

The left channel audio signal derived in stereo demodulator channel 17 is applied to the input terminals 18 and 19 of a 38 kHz. filter 20. Likewise, the right channel audio signal from demodulator 17 is applied to the input terminals 21 and 22 of another 38 kHz. filter 23. Besides serving to attenuate any 38 kHz. signals remaining at the output of the biplex detector, these filters perform the additional function of providing de-emphasis to the two audio signals, necessary when pre-emphasis is applied at the transmitter to maintain an optimum signal-to-noise ratio. The output of filters 20 and 23 connect to conventional left and right channel audio amplifiers 24 and 25, respectively, which in turn drive loudspeakers 26 and 27.

Referring now to the circuitry contained in stereo demodulator channel 17, one output terminal 15 of detector 14 is connected to the base 28 of a composite amplifier transistor 29. The other output terminal 16 is grounded and base 28 is further connected to a source B— of negative unidirectional current by a resistor 30 and to ground by a resistor 31. The emitter 32 of transistor 29 is connected to ground by a resistor 33 and the collector 34 is connected to one terminal of the primary winding 35 of a 19 kHz. interstage transformer 36. Winding 35 is resonated at 19 kHz. by a shunt connected tuning capacitor 37 and has a tap 38 connected to the base 39 of a biplex demodulator transistor 40. Base 39 is also connected by a resistor 41 to the center tap 42 of the secondary winding 43 of a 38 kHz. interstage transformer 44. One end terminal of secondary winding 43 is connected by a resistor 45 to the collector 46 of transistor 40 and the remaining end terminal is connected by a resistor 47 to the emitter 48 of transistor 40. The collector and emitter electrodes of device 40 are connected respectively to input terminals 18 and 21 of 38 kHz. filters 20 and 23, respectively, the remaining input terminals 19 and 22 of these filters being grounded. Center tap 42 is also connected by a resistor 49 to a source B— of negative unidirectional current and is bypassed to ground by a capacitor 50.

In operation, the composite output signal from FM detector 14 is amplified by composite amplifier transistor 29 and applied via center tap 38 of winding 35 to the base 39 of biplex detector transistor 40. Under no-switching-voltage conditions, biplex transistor 40 is biased to cut-off by maintaining a negative bias between its base and its collector and emitter electrodes. To forward bias the transistor, the voltage at the emitter must be made less negative than the voltage at the base. In the present receiver this forward bias is supplied by a regenerated 38 kHz. continuous-wave demodulation switching signal supplied to the collector and emitter via interstage transformer 44. Since secondary winding 43 of transformer 44 is center tapped, during any time interval in which the emitter-base junction of transistor 40 is positively biased, the collector-base junction is negatively biased. Assuming this to be the condition during the first half-cycle, just the reverse is true during the second half-cycle, but the action of the transistor is the same due to the bilateral effect. As a result, current flows through load resistors 45 and 47, winding 43 and between the collector and emitter in both half-cycles, reversing directions in accordance with the alternations of the 38 kHz. switching signal.

The composite signal from detector 14, which includes two interleaved components, (1) an audio frequency component representing the sum of the left and right program channels $(L+R)$ and (2) a 38 kHz. suppressed-carrier subcarrier component representing the difference of the two program channels $(L-R)$, is applied to the base of transistor 40 while that device is being switched at a 38 kHz. rate. The $(L+R)$ audio signal appears at like polarity across the left and right channel output load resistors 45 and 47 by way of secondary winding 43, but the $(L-R)$ modulated 38 kHz. subcarrier is prevented from being so coupled by the parallel combination of resistor 49 and capacitor 50, which presents a low impedance to ground at 38 kHz.

Transistor 40, as a result of being bilaterally switched by the regenerated 38 kHz. switching signal, effectively reinserts a continuous-wave carrier in the 38 kHz. $(L-R)$ modulated suppressed-carrier subcarrier signal, and demodulates the resulting AM signal into two $(L-R)$ audio signal components of opposite polarity; a $+(L-R)$ signal in resistor 45 and a $-(L-R)$ signal in resistor 47. These components matrix with the like-polarity $(L+R)$ components developed in the respective load resistors to produce audio signals of the form (2L) and (2R), which correspond to the desired left and right stereophonic program signals.

During monophonic (nonstereo) FM transmission, the 19 kHz. pilot-carrier is not transmitted and no 38 kHz. switching signal is applied to transistor 40. This causes that device to remain cutoff so that only the $(L+R)$ audio component from composite amplifier 29 is divided equally between the load resistors 45 and 47 via the two half-sections of the transformer winding 43. As a result, the $(L+R)$ signal is reproduced at equal levels in both the left and right stereo channels, as required for proper monophonic program reproduction.

In order to detect the suppressed-carrier amplitude-modulated subcarrier, it is necessary to apply to the biplex detector transistor 40 a demodulation or switching signal which corresponds to the carrier component of the suppressed-carrier subcarrier signal. The present receiver provides novel means for applying such a demodulation signal which specifically includes a unique frequency doubler circuit for obtaining a 38 kHz. continuous-wave carrier component from the received 19 kHz. pilot-carrier. More particular attention will now be given to that portion of the receiver.

Interstage transformer 36, which it will be recalled has a primary winding 35 tuned to resonance at 19 kHz., has an untuned secondary winding 51 having one terminal connected to the base 52 of a doubler transistor 53. The remaining terminal is connected to ground by the parallel combination of a resistor 54 and a capacitor 55. The emitter 56 of transistor 53 is connected to ground by a resistor 57, and the collector 58 is connected to a source B— of negative unidirectional current by a collector load resistor 59. Collector 58 is further connected to base 52 by a resistor 60 and to the base 61 of a 38 kHz. amplifier transistor 62 by a coupling resistor 63. Base 61 is connected to ground by a bias resistor 64, and the emitter 65 of transistor 62 is connected to ground by the parallel combination of a resistor 66 and a capacitor 67. The collector 68 of transistor 62 is connected to one terminal of the primary winding 69 of the 38 kHz. interstage transformer 44. Winding 69 is tuned to 38 kHz. by a shunt-connected capacitor 70 and has a tap 71 connected to a source B— of negative unidirectional current.

In operation, the 19 kHz. pilot-carrier contained in the composite signal is coupled by interstage transformer 36 to the base 52 of doubler transistor 53. Resistor 54, being connected to a source of negative unidirectional current through resistors 59 and 60, serves as part of a voltage divider network to apply a negative bias to the base 52 of doubler transistor 53. Capacitor 55 bypasses resistor 54 to ground and resistor 57 serves as a bias resistor for emitter 56. The bias potentials thus applied to the base and emitter of transistor 53 are such that the device is operative only on negative excursions of the applied 19 kHz. signal, and therefore produces an output signal of phase-inverted positive half-cycles at the junction of resistors 59, 60, 63 and collector 58. At the same time, a predetermined portion of the applied 19 kHz. signal is cross-coupled in-phase by resistor 60 to collector 58, where it combines with the phase-inverted alternate half-cycles produced by the periodic conduction of transistor 53 to create in load resistor 59 a signal containing 19 kHz. half-wave pulses recurring at a 38 kHz. rate. To obtain a reasonably symmetrical 38 kHz. waveform, it is necessary that the alternate 19 kHz. half-cycles applied to load resistor 59 by transistor 53 be substantially twice the amplitude of the 19 kHz. pilot-carrier applied via the passive coupling impedance 60. Since resistors 60 and 59 form a voltage divider network to the latter signal, the approximate required grain for transistor amplifier stage 53 can be expressed by the formula:

$$A_{53}=\frac{2R_{59}}{R_{59}+R_{60}}$$

Resistors 63 and 64 serve as a voltage divider for coupling a portion of the regenerated 38 kHz. demodulating signal to base 61 of the subsequent 38 kHz. amplifier transistor 62. Transistor 62 operates in a more or less conventional manner to amplify the applied 38 kHz. signal and impress it across the primary winding 69 of interstage transformer 44, which is tuned to 38 kHz. by capacitor 70. Emitter resistor 66 provides operating bias for transistor 62 and capacitor 67 serves as an emitter bypass capacitor.

It is appropriate to comment here on one of the properties of the described doubler amplifier which makes its use in a frequency-modulation stereophonic receiver system especially attractive. Unlike a prior art circuit which utilized a pair of diodes connected back to back across a center-tapped tuned transformer winding, a frequency-doubler circuit constructed in accordance with the invention requires no balanced transformer input circuit. This is a significant advantage in circuit constructions using integrated circuit techniques, wherein inductors of any kind are extremely difficult, if not impossible, to satisfactorily duplicate at low operating frequencies.

Although the present embodiment shows the invention used in conjunction with a transformer-coupled biplex demodulator, it will be appreciated that other types of demodulators, including that disclosed and claimed in the copending U.S. application No. 626,482 of Flemina Dias, assigned to the present assignee, could be used as well.

Aside from the future advantages in integrated circuit construction, the invention offers manufacturing economies and improved performance over existing frequency-doubler circuits. Improved efficiency is achieved without the need of additional components and, in its preferred embodiment, the present invention in fact permits the elimination of a costly interstage coupling transformer.

By way of illustration but in no sense by way of limitation, the following component values have been used in the receiver described herein:

Resistor 30—56,000 ohms
Resistor 31—5,600 ohms
Resistor 33—330 ohms
Resistor 41—1,200 ohms
Resistor 45—9,100 ohms
Resistor 47—10,000 ohms
Resistor 49—470 ohms
Capacitor 50—.022 microfarads
Resistor 54—8,200 ohms
Capacitor 55—5 microfarads
Resistor 57—15,000 ohms
Resistor 59—68,000 ohms
Resistor 60—33,000 ohms
Resistor 63—5,600 ohms
Resistor 64—33,000 ohms
Resistor 66—470 ohms
Capacitor 67—5 microfarads While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wave-signal receiver adapted to receive a composite signal of the type having a suppressed-carrier subcarrier signal component and a pilot-carrier signal component of one-half the frequency of said subcarrier component, a single-stage frequency-doubler having an input circuit and an output circuit, comprising:

means for applying said pilot signal in common phase to said input and output circuits;

means coupled between said input circuit and said output circuit for combining at said output circuit said applied output pilot-carrier signal with inverted and amplified alternate half cycles of said applied input pilot-carrier signal to create therein a signal containing half cycles recurring at twice the frequency of said pilot-carrier signal, said combining means including a single-stage transistor amplifier biased to operate only in response to common-polarity alternate half cycles of said applied input pilot signal for inverting and amplifying said common-polarity alternate half cycles to provide at said output circuit phase-inverted alternate half cycles of said pilot-carrier signal having an amplitude substantially twice the amplitude of half cycles of said applied output pilot-carrier signal.

References Cited

UNITED STATES PATENTS

| | | | |
|---|---|---|---|
| 3,209,270 | 9/1965 | De Vries | 329—50 |
| 3,030,566 | 4/1962 | Collins | 207—220 |

KATHLEEN H. CLAFFY, Primary Examiner

J. D'AMICO, Assistant Examiner

U.S. Cl. X.R.

307—261, 296; 179—15